United States Patent [19]

Chen

[11] 4,224,214

[45] Sep. 23, 1980

[54] INJECTION MOLDING OF AMIC ACID AND AMIDE-IMIDE POLYMERS AND MOLDING COMPOSITIONS

[75] Inventor: Yu-Tsai Chen, Glen Ellyn, Ill.

[73] Assignee: Standard Oil Company (Indiana), Chicago, Ill.

[21] Appl. No.: 927,771

[22] Filed: Jul. 25, 1978

Related U.S. Application Data

[63] Continuation-in-part of Ser. No. 850,397, Nov. 10, 1977, abandoned.

[51] Int. Cl.² ............................................. C08K 7/02
[52] U.S. Cl. ............................... 260/37 N; 264/325; 264/331; 264/328.1
[58] Field of Search ................... 528/350; 260/37 N; 264/325, 328, 331

[56] References Cited

U.S. PATENT DOCUMENTS

| | | | |
|---|---|---|---|
| 3,554,969 | 1/1971 | Long | 260/37 N |
| 3,573,260 | 3/1971 | Morello | 528/350 |
| 3,748,304 | 7/1973 | Stephens | 528/350 |
| 4,016,140 | 4/1977 | Morello | 528/350 |
| 4,026,876 | 5/1977 | Bateman | 528/350 |
| 4,115,372 | 9/1978 | Onder | 528/73 |
| 4,136,085 | 1/1979 | Hanson | 528/189 |

*Primary Examiner*—Paul R. Michl
*Attorney, Agent, or Firm*—Stephen L. Hensley; William T. McClain; William H. Magidson

[57] ABSTRACT

Method for preparing molded articles comprising injection molding at high compression ratios polymers having a spiral flow of at least about 4 inches at 600° F. and 20,950 psi. and prepared from at least one aromatic tricarboxylic acid derivative and at least one aromatic diprimary diamine. Also disclosed are filled molding compositions containing such polymers and a method for preparing molded articles therefrom.

17 Claims, No Drawings

INJECTION MOLDING OF AMIC ACID AND AMIDE-IMIDE POLYMERS AND MOLDING COMPOSITIONS

This is a continuation-in-part of my copending application Ser. No. 850,397, filed Nov. 10, 1977, now abandoned.

This invention relates to aromatic polyamide-imides, polyamide amic acids, and polymers containing both amide-imide and amic acid units in their molecules, and preparation of molded articles therefrom. More particularly, the invention relates to polymers prepared from aromatic tricarboxylic acid derivatives and aromatic diamines, and the injection molding of such polymers at high compression ratios.

Aromatic polyamide-imides prepared from aromatic tricarboxylic acid derivatives and aromatic diamines can be molded into articles which exhibit a number of desirable properties and are particularly well suited for use in high temperature environments owing to the high thermal stability of the polymers. Exemplary of prior art efforts directed at preparation and molding of polyamide-imide compositions is U.S. Pat. No. 3,573,260, to Morello which is incorporated herein by specific reference thereto. According to Morello, a polymer containing amic acid and amide-imide units is prepared by reacting approximately equimolar amounts of an acyl halide derivative of an aromatic tricarboxylic acid anhydride with an aromatic diprimary diamine in an organic solvent under substantially anhydrous conditions at a temperature, generally from about 10° to 150° C., and for a time, generally from about 1 to 24 hours, such that a relatively high molecular weight polymer containing up to about 50% amide-imide groups and at least about 50% amic acid groups is formed. It is further disclosed that this polymer is converted to a molding compound by treatment with a solvent mixture of a nitrogen or sulfoxide containing organic polar solvent and water or an organic diluent having a boiling point below that of the organic polar solvent, followed by removal of the diluent from the treated polymer, and heating of the same at a temperature of about 170° to 280° C., at a rate such that degradation is avoided. It is disclosed that the resultant polyamide-imide molding powders are suitable for compression molding, and that for optimum molding grade properties, the molding powder should be adjusted such that a 32 weight percent solution thereof in N-methylpyrrolidone gives a Brookfield viscosity of 10–35 poises.

U.S. Pat. No. 4,016,140 to Morello is also directed to the molding of polyamide-imides and is incorporated herein by specific reference thereto. According to this patent, a copolymer is prepared by reacting approximately equimolar amounts of a tricarboxylic acid anhydride derivative and a mixture of largely or wholly aromatic diprimary diamines in an organic solvent, such as N-methylpyrrolidone, N,N-dimethylformamide, N,N-dimethylacetamide, or cresols, under substantially anhydrous conditions for a time and at a temperature whereby a predominantly amic acid group-containing copolymer is formed, and this copolymer is then converted into a molding compound by treatment at a temperature ranging from about 300° F. to 700° F. for a period of about 0.5 to 5 hours to imidize the amic acid groups in the copolymer. It is disclosed that the resultant molding compounds are suitable for compression molding and injection molding at high temperatures using a one-minute mold cycle.

While high strength molded articles of excellent thermal stability can be prepared from polyamide-imide molding compounds such as are disclosed in the above-described references, difficulties are encountered in the processing of such molding powders owing to the high melting points and melt viscosities of the polymers. For example, while the molding powders of Morello '140 are suitable for injection molding, the injection molding must typically be carried out using screws of low compression ratio, generally less than about 1.5 to 1.8, in order to prevent degradation of the polymers due to heat and shear during molding and attendant sacrifices in the physical properties of molded articles. Low compression ratio injection molding of polyamide-imides is disadvantageous because conventional molding equipment must often be modified in order to carry out such processing. Additionally, molded articles cannot be prepared from filled compositions containing the above-described polymers because the high viscosities of the polymers typically prevents suitable dispersion of filler throughout polymer melts and molded articles, and further, because coupling agents typically employed to aid in dispersion of fillers such as fibers degrade at the high temperatures required for processing of the polymers. Additionally, addition of fillers to the polymers increases melt viscosities and degradation.

It has been proposed to improve the processability of polyamide-imides prepared from aromatic tricarboxylic acid derivatives and aromatic diamines by employing specially selected reactants in the preparation of such polymers. Thus, for example, U.S. Pat. No. 4,026,876 to Batemen et al. discloses polyamide-imide precursors prepared from an aromatic tricarboxylic acid anhydride, and a phenylindane diamine or a mixture thereof with a second diamine which may be aromatic, aliphatic, or cycloaliphatic. It is disclosed further that such precursors must be imidized by thermal or chemical means to form polyamide-imides of improved solubility as compared with polyamide-imides prepared solely from non-phenylindane diamines. The disclosed polyamide-imides find use as coatings, adhesives, laminating resins, wire enamels, films, and molding compounds which may include reinforcements such as glass fibers. However, it is not disclosed that such molding compounds can be injection molded.

Difficulties are also encountered in the processing of polyamide-imides prepared from starting materials other than aromatic tricarboxylic acid derivatives and diamines, and prior art efforts directed at improving the processability of such polymers may be considered relevant. Exemplary of such prior art efforts is U.S. Pat. No. 3,179,633 to Endry, wherein it is disclosed that a polyamide-imide precursor prepared from an aromatic tetracarboxylic acid dianhydride and meta- or para-phenylenediamine may be shaped into useful articles and subsequently converted to a polyamide-imide by thermal or chemical means. Included among the useful articles prepared from the disclosed polymers are films, coatings, and fibers, but there is no suggestion to injection mold the polymers. A related proposal is described in U.S. 3,179,634 to Edwards, wherein it is disclosed to prepare a controlled molecular weight polyamide amic acid having an inherent viscosity of at least 0.1, and preferably ranging from 0.3 to 5, from an aromatic tetracarboxylic acid dianhydride and an aromatic diprimary diamine. It is disclosed that polymer molecular weight is controlled through the use of an excess of the dianhydride or the diamine, or by employing phthalic anhydride to cap the ends of the polymer chain. The disclosed polyamic acids can be shaped into useful articles such as films and fibers, and subsequently imidized by chemical or thermal treatment. However, there is no suggestion to injection mold the polyamic acids. U.S. Pat. No. 4,024,108 to Charbonneau is also directed to polyamide-imides of improved processability, it being disclosed that polyamide-imides prepared from alkylene linked aromatic dianhydrides and organic diprimary diamines can be processed by conventional thermoplastic processing techniques such as injection and compression molding, and fiber spinning. Despite the above-described prior art efforts, there exists a need for a simple method of preparing high strength thermally stable molded articles from polymers prepared by polymerizing aromatic tricarboxylic acid derivatives and aromatic diamines. Accordingly, it is an object of this invention to provide such a method. Another object of the invention is to provide molding compositions suitable for injection molding using high compression ratio screws. A further object of the invention is to provide filled molding compositions suitable for injection molding without serious degradation of polymers and which allow for uniform dispersion of filler throughout articles molded therefrom. These and other objects of the invention will be apparent to persons of skill in the art from the following description and the appended claims.

The objects of this invention can be obtained by controlling the molecular weight of polymers prepared by polymerizing at least one aromatic tricarboxylic acid compound and at least one aromatic diprimary diamine such that the polymers have flow properties which allow for high compression ratio injection molding of the polymers without substantial degradation thereof during molding. As is well known, decreases in polymer molecular weights result in increases in polymer melt flow properties and improvements in polymer processability. By controlling the molecular weights of polymers prepared from at least one aromatic tricarboxylic acid derivative and at least one aromatic diprimary diamine such that the polymers have spiral flow values in excess of about 4 inches at 600° F. and 20,950 psi., the polymers can be plasticated and compacted between the flights of high compression ratio screws employed in high compression ratio injection molding without serious degradation of the polymers. In order to ensure processability over a wide range of compression ratios and under desirable processing conditions, polymers having spiral flows ranging from about 5 to 10 inches, and more preferably, from about 5 to 8 inches at 600° F. and 20,950 psi. are employed.

These polymers are sufficiently fluid in the molten state that molding compositions containing the polymers and even high levels of fillers can be prepared and injection molded with excellent dispersion of filler throughout the resultant molded articles. Polymers having spiral flows below 4 inches are so viscous in the molten state that proper wetting and dispersion filler cannot be achieved; and increased viscosities due to the filler results in severe degradation of the polymers during injection molding. However, the polymers employed according to this invention, having spiral flows of at least 4 inches at 600° F. and 20,950 psi., can be combined with fillers and injection molded without substantial degradation. The injection molding can be carried out at both high and low compression ratios although, as set forth below, such compression ratios are lower than those employed in injection molding of unfilled polymers in order to account for increased melt viscosities of the filled compositions.

For purposes hereof, spiral flow values are determined by injection molding a sample of polymer using a 5 oz. Stokes reciprocating screw injection molding machine and a spiral flow mold having a semi-circular cavity of semi-circular cross-section. The cavity is 10" long, has a radius of 1½", and is marked every ¼" for purposes of measurement. The diameter of the cavity cross-section is ¼". Molding conditions employed in measuring spiral flow are as follows:

| Screw | |
|---|---|
| L/D | 20:1 |
| Compression Ratio | 1:1 |
| Barrel Temperature | 600° F. |
| Nozzle Temperature | 630° F. |
| Mold Temperature | 425° F. |
| Molding Cycle | |
| Injection Forward | 3 seconds |
| Injection Hold | 7 seconds |
| Overall | 20 seconds |
| Injection Speed | Maximum |
| Injection Pressure | 20,950 psi. |
| Back Pressure | 300 psi. |

After injection of polymer into the spiral flow mold, the mold is cooled and opened and the length of the molded spiral is measured.

Polymer melt flow rate also is a common measure of polymer processability and may serve as a general guide in determining suitability of polymers for use according to this invention. For purposes hereof, melt flow rate is expressed in terms of g/10 min. at 620° F. and determined by heating a sample of polymer from room temperature to 620° F. over a period of 25 to 30 minutes in a standard Buehler mold assembly (1"×¾") and extruding 1 to 2 inch samples through a 1/16" one-hole die having a length to inside diameter ratio of 10 using a piston driven mold ran having a pressure of 3000 lbs. applied thereto by a Carver Model C hydraulic press. Extrudate obtained during a known time interval is weighed and the amount of extrudate that would be obtained over a period of 10 minutes is calculated. The molten extrudate may contain a minor amount of unmelted polymer solids which exert a slight effect on the observed polymer melt flow rate. Generally, polymers having melt flow rates in excess of about 15 g/10 min. at 620° F. are useful according to this invention. However, spiral flow is to be considered determinative for purposes hereof because it is determined under conditions which more closely approximate actual injection molding conditions than do the conditions employed in determining melt flow rates. Accordingly, even polymers having melt flow rates below 15 g/10 min. at 620° F. are suitable for use according to this invention so long as spiral flow exceeds about 4 inches at 600° F. and 20,950 psi. Conversely, polymers having melt flow rates of 15 g/10 min. or higher at 620° F. are not suitable according to this invention if spiral flow is less than about 4 inches.

Polymers suitable for use according to this invention are prepared from one or more aromatic tricarboxylic acid derivatives and one or more aromatic diprimary diamines. The polymers contain in their molecules repeating units of one or both of the following structures:

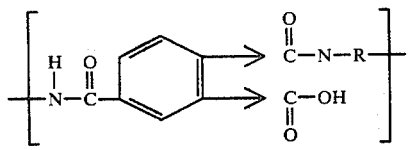

which is referred to herein as an amic acid unit or group; and

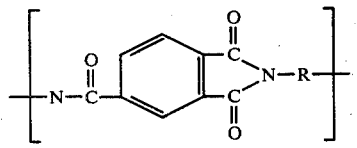

which is referred to herein as an amide-imide unit or group. In the above structural formulas, → denotes isomerism, and R is a divalent aromatic hydrocarbon radical or two such divalent aromatic radicals joined directly or by stable linkages such as —O—, —$CH_2$—, —CO—, or —$SO_2$—.

In polymers having molecules containing both amic acid units and amide-imide units, either of such units can predominate so long as the polymer spiral flow values are as set forth herein.

Briefly, the polymers employed according to this invention can be prepared by polymerizing at least one aromatic tricarboxylic acid derivative and at least one aromatic diprimary diamine such that the polymer molecular weight is sufficiently low that the polymer spiral flow values are at least about 4 inches at 600° F. and 20,950 psi. Polymer molecular weights, and therefore flow properties, can be controlled by a variety of techniques. Thus, for example, one or more aromatic tricarboxylic acid derivatives and one or more aromatic diprimary diamines can be polymerized in an organic solvent such as N-methylpyrrolidone, N,N-dimethylformamide, N,N-dimethylacetamide, or cresols, under substantially anhydrous conditions at a temperature up to about 150° C., and preferably ranging from about 20° to 50° C., to form a polymer containing predominantly amic acid units. This polymer can be recovered such as by precipitation in distilled or deionized water, and then washed. Such polymers can then be subjected to known chemical or thermal treatment to substantially convert the polyamide amic acid units to polyamide-imide units. However, according to this invention, such chemical or thermal treatment is avoided and the washed, predominantly amic acid group-containing polymer is dried under conditions which do not permit substantial imidization of amic acid units and increases in molecular weight. In order to substantially dry the washed polymers while avoiding substantial imidization of amic acid units in the polymer molecules, the polymer is dried at temperatures below 300° F., preferably under vacuum, over a period of at least 4 hours. In order to achieve rapid drying rates while minimizing imidization, drying temperatures ranging from about 225° to 275° F. are preferably employed. Such dried, predominantly amic acid group-containing polymers have spiral flow values of at least about 4 inches at 600° F. and 20,950 psi., and are suitable for use according to the invention.

Polymer flow properties can also be controlled by carrying out a polymerization reaction, such as described above, wherein a capping agent or other reactant is employed to control polymer molecular weights. Thus, for example, in a polymerization reaction wherein essentially equimolar amounts of an aromatic tricarboxylic acid derivative such as acyl halide derivatives of trimellitic acid anhydride and one or more aromatic diprimary diamines are reacted under conditions such as are set forth above, replacement of a minor portion of the acyl halide derivative with trimellitic acid anhydride yields polymers suitable for use according to this invention. When the amount of trimellitic anhydride which is substituted for the acyl halide component is at least about 0.02, preferably from about 0.02 to about 0.08, and more preferably, from about 0.05 to about 0.08 mol per mol of total tricarboxylic acid derivative, spiral flows well in excess of 4 inches at 600° F. and 20,950 psi. can be achieved, and such polymers have spiral flows of at least about 4 inches even after conversion of the majority of the amic acid units contained in the polymer molecules to amide-imide units by chemical or thermal imidization such as by heating for a period of about 4 hours at 425° F. Such polymers are preferred herein and are described in greater detail in commonly assigned U.S. Pat. No. 4,136,085 which is incorporated herein by reference.

Other techniques, such as varying reaction conditions and varying reactant concentrations in a given polymerization reaction, can also be employed to control polymer molecular weights such that the polymers are suitable for use according to this invention. Additionally, polymers having high spiral flows can be chemically or thermally imidized to a limited extent to obtain polymers which are still suitable for use according to the invention but which have decreased spiral flows.

As set forth above, polymers employed according to the invention are prepared by polymerizing at least one aromatic tricarboxylic acid derivative and at least one aromatic diprimary diamine. Suitable aromatic tricarboxylic acid derivatives are those materials based on acids having from one to four benzene or lower alkyl-substituted benzene rings and two carboxyl groups ortho to one another. Preferred among such derivatives are anhydrides and acyl halide derivatives thereof due to the high reactivity of anhydrides with primary amino groups and the reactivity of acyl halide groups. Examples of useful derivatives include trimellitic acid, the anhydride and acyl halide derivatives thereof, 2,3,6-naphthalene tricarboxylic acid, the anhydride and acyl halide derivatives thereof, 1,5,6-naphthalene tricarboxylic acid, the anhydride and acyl halide derivatives thereof, and 2,6-dichloronaphthalene-4,5,7-tricarboxylic acid, and the anhydride and acyl halides thereof. Mixtures of derivatives also can be used. Most preferably, the aromatic tricarboxylic acid derivative is the 4-acyl chloride derivative of trimellitic anhydride or a mixture thereof with a minor portion, for example, at least about 0.02, and preferably from about 0.05 to about 0,08 mol per mol of total tricarboxylic acid derivative, of trimellitic anhydride.

Useful diamines are those containing one or more aromatic rings and two primary amino groups. Preferably, such diamines are aromatic diprimary diamines having from 6 to 10 carbon atoms, or aromatic diprimary diamines composed of two aromatic moieties of 6 to 10 carbon atoms each, each such moiety containing one primary amino group and being linked to the other moiety either directly or through a relatively stable bridging group such as the following: —O—, —S—, —$SO_2$—, —CO—, or —$CH_2$—. Examples of such diamines include para- and meta-phenylenediamine, para- and meta-xylene diamine, oxybis(aniline), thiobis(aniline), sulfonylbis-(aniline), diamino-benzophenone, methylenebis(aniline), benzidine, 1,5-diaminonaphthalene, oxybis(2-methylaniline), thiobis(2-methylaniline), and the like. Of course, mixtures of diamines can be used and a minor amount of other diamines such as aliphatic diamines can be used. Alkylene diamines such as ethylenediamine, propylenediamine, 2,2-dimethylpropylenediamine, hexamethylenediamine, and decamethylenediamine are exemplary of such other diamines. From the standpoint of physical properties of molded articles, oxybis(aniline), meta-phenylenediamine, and mixtures thereof are preferred. Most preferably, the diamine component employed according to this invention is a mixture of from about 60 to about 80 mol % oxybis(aniline) and from about 20 to about 40 mol % meta-phenylenediamine.

The above-described tricarboxylic acid derivatives and diamines are reacted in essentially equimolar amounts although slight excesses of either reactant can be employed.

According to the invention, filled molding compositions containing the above-described polymers can be prepared and injection molded. The spiral flow values of the polymers, being at least about 4 inches at 600° F. and 20,950 psi., are sufficiently high to ensure substantial wetting and dispersion of fillers during processing such that excellent dispersion of fillers throughout injection molded articles is achieved. Filled molding compositions according to this invention contain from about 5 to about 60 wt.% filler and from about 40 to about 95 wt.% polymer. Such compositions are more viscous at processing temperatures than the unfilled polymers of this invention, and in order to achieve optimum physical properties of molded articles without substantial sacrifices in processability of the molding compositions, filler levels ranging from about 20 to about 40 wt.% are preferred.

Useful fillers include a variety of materials commonly employed as fillers for thermopolastic resins. Examples include fibrous materials such as glass and graphite fibers; particulates such as kaolin, silica, calcium carbonate, barium sulfate, alumina powder, mica, talc, and glass beads; polymeric materials which are compatible, in terms of processing temperature, with the polymer to be filled; and combinations thereof. The polyamide amic acids and polyamide-imides to be filled according to this invention are processable at temperatures ranging from about 550° to about 700° F. and for purposes hereof, compatible polymeric fillers are defined as materials having processing temperatures within about 70° F., and preferably about 50° F., of the polyamide amic acid or polyamide-imide processing temperature. The polymeric fillers also should sufficiently viscous under processing conditions as to allow for thorough dispersion throughout the polymers to be filled. Examples of useful polymeric fillers include polysulfones, polyphenylene sulfides and oxides, aromatic polyamides, polyimides, and polyamide-imides.

Preferred fillers according to this invention are glass and graphite fibers, and particularly those having a length ranging from about ⅛ to about ⅜ inch. Most preferably these fibers range from about 3/16 to about 5/16 inch in length. The preferred particulate filler is kaolin. Preferred polymeric fillers are polysulfones, polyphenylene sulfides, and polyamideimides.

The filled molding compositions of this invention are prepared by blending the fillers and polymers described above. In order to ensure thorough admixture of filler and polymer, blending is carried out with the polymer in the molten state, generally at a temperature ranging from about 550° to about 700° F., and preferably from about 590° to about 670° F. Preferably, solid polymer and filler are first dry-blended, for example, on a mill or similar apparatus, and then the blend is heated to melt or soften the polymer, and the blending is continued. The melt blending is most conveniently carried out in an extruder although other apparatus can be employed. Molding compositions according to this invention can be used in the form of powders or pellets and are suitable for injection molding at both low and high compression ratios.

Polymers and filled molding compositions of this invention can be blended with pigments and other additives without adverse effects on processability. Titanium dioxide is a particularly effective pigment. Processing aids, such as polytetrafluoroethylene, can also be employed. Such additives can be blended with the polymers and molding compositions in the same manner that fibers are blended with the polymers.

Injection molding techniques which are employed according to this invention are known to persons of skill in the art and are commonly referred to as reciprocating screw injection molding. The general principles of reciprocating screw injection molding are set forth below, it being understood that the description is intended for purposes of illustration and not limitation except as indicated.

In reciprocating screw injection molding, powdered or pelletized polymer is delivered to a hopper and from there fed into the feed end of a barrel, typically cylindrical, which houses a screw adapted for rotation and reciprocal motion within the barrel along the length thereof. The barrel also has a nozzle end opposite the feed end, and may have a chamber located near the nozzle end. Polymer fed from the hopper into the barrel passes into and through the area between flights of the rotating screw and, during such passage, is plasticated due to heat and the working of the polymer between the interior surface of the barrel and the surfaces between screw flights. Working of the polymer between screw flights and the interior of the barrel compacts the polymer between screw flights. After passing between the screw flights, the compacted, plasticated polymer accumulates in the barrel or in a chamber near the nozzle.

During rotation of the screw, pressure, commonly referred to as "back pressure", is applied to the end of the screw at the feed end of the barrel. An opposing pressure develops due to accumulation of polymer at the nozzle end of the barrel, and when this pressure exceeds the back pressure, the screw is pushed away from the nozzle. When the accumulating polymer fills the chamber or the portion of the barrel vacated by the screw, or in some instances, when the screw reaches a pre-determined position, pressure, commonly referred to as "injection pressure", is applied to the screw, and the accumulated polymer is forced through the nozzle into a mold which is commonly heated. In some cases, a booster is used to aid in the injection. Typically, a non-return check valve is employed to prevent polymer from flowing back toward the screw. Following injection of the polymer into the mold, the polymer is held therein, the mold is cooled, and the molded part removed.

The exact conditions under which the polymers described herein are injection molded will vary depending upon the polymer to be molded, the polymer spiral flow, the injection molding equipment employed, and the molded article to be prepared. Typically, barrel temperatures ranging from about 550° to about 700° F., and preferably, from about 590° to about 670° F., are employed in order to ensure thorough plastication of the polymers without degradation thereof. Similar nozzle temperatures are employed. Typical mold temperatures range from about 380° to 450° F., and preferably from about 400° to 440° F. Injection pressures should be sufficiently high to ensure filling of the mold. Suitable injection pressures range from about 15,000 to 45,000 psi., and preferably from about 19,000 to 40,000 psi. Typical back pressures range from about 50 to 400 psi.

Molding cycles also vary depending upon choice of polymer, molding equipment, and the like. Generally, the overall molding cycle takes place over a period of time ranging from about 15 seconds up to several minutes. Preferably, the overall molding cycle takes place over a period of less than one minute when molding predominantly amic acid group-containing polymers in order to ensure optimum physical properties of articles molded therefrom. That portion of the overall molding cycle during which the screw or ram is forced toward the nozzle, commonly referred to as "injection forward", takes place over a period ranging from about 1 to 5 seconds. The screw or ram is held in the injection position for about 5 seconds to 2 minutes and this time period is commonly referred to as "injection hold". The remainder of the overall molding cycle, comprises cooling time, and time for opening and closing of the mold to remove the molded part therefrom.

Screws employed in reciprocating screw injection molding are designed to plasticate and compact polymer passing between the screw flights. Screws are also designed to account for changes in polymer volume resulting from plastication of the polymer. In order to provide for such compaction and account for changes in polymer volume, the volume between screw flights can be varied along the length of the screw. Compression ratio, a measure of the change in volume between screw flights along the length of the screw, is defined as the ratio of volume between screw flights at the nozzle end of the screw to the volume between screw flights at the feed end of the screw. High compression ratio screws allow for a high degree of compaction of polymer during molding while screws of low compression ratio are designed for use in the molding of polymers which are so viscous that a high degree of compaction results in substantial degradation.

The precise relationship between polymer flow properties and compression ratios is not presently known, however, it has been found that the polymers described herein, having spiral flows of at least about 4 inches at 600° F. and 20,950 psi. can be injection molded using reciprocating screws of high compression ratio. Compression ratios such as are employed in the injection molding of conventional thermoplastic materials are suitable according to this invention. Compression ratios up to about 3.5 are preferred with such ratios ranging from about 1.8 to 3.5 being more preferred and from about 2.25 to 2.75 being most preferred. Filled molding compounds containing the above-described polymers can also be injection molded at high compression ratios according to the invention but such ratios should be adjusted to account for increased viscosities due to the filler. At filler levels up to about 60 wt.%, compression ratios up to about 2.5 can be employed without serious degradation of the polymer. Preferred compression ratios for the molding of filled molding compositions range from about 1 to 2.5.

Molded articles prepared according to this invention exhibit physical properties which are comparable or superior to those of molded articles prepared by conventional low compression ratio injection molding or compression molding of polyamide-imides prepared from at least one aromatic tricarboxylic acid derivative and at least one aromatic diprimary diamine. As such, molded articles prepared according to this invention find use in applications for which such conventionally molded polyamide-imide articles are suited. Additionally, as in the case of such conventionally molded articles, articles prepared according to this invention can be subjected to heat treatment at temperatures, generally ranging from about 200° to 500° F. for a period of up to several days such that the physical properties, and particularly the high temperature properties, of the molded articles are improved. Molded articles subjected to such heat treatment are ideally suited for use in high temperature environments.

The following examples illustrate the invention and are not intended to limit the scope thereof.

EXAMPLE I

A predominantly amic acid group containing polymer having a spiral flow of 7.5 inches at 600° F. and 20,950 psi. and an estimated melt flow rate of about 30 to 50 g/10 min. at 620° F. was prepared according to the following procedure: 17.3 parts by weight of the 4-acyl chloride derivative of trimellitic acid anhydride (TMAC), 11.5 parts by weight oxybis(aniline), and 2.7 parts by weight metaphenylenediamine were polymerized in 68.5 parts by weight dimethylacetamide in a jacketed 1000 gallon glass-lined Pfaudler reactor equipped with a mechanical stirrer and nitrogen purge. The TMAC was added over 3 to 4 hours, temperature increasing from 40° to 50° F. to a peak of 90° to 100° F. during such addition. Polymerization was continued for another 4 to 5 hours following completion of TMAC addition after which the polymer was precipitated with deionized water using a Fitz Comminuting Mill manufactured by Fitzpatrick Corp. The precipitated polymer was then washed four times with deionized water and then flash dried at 250° F. and steam dried at 300° F. A sample of this polymer, in the form of powder, was further dried for 16 hours in a vacuum oven at 250° F. After drying, the powdered polymer was blended with 3 wt.% $TiO_2$ at 600° F. and formed into pellets using a Colombo RC-9 twin screw extruder manufactured by the Italian firm Laborazione Maperte Plastiche. The $TiO_2$ was used as a pigment.

Test bars were injection molded from this composition on a purged 3-ounce Van Dorn reciprocating screw injection molding machine equipped with a non-return check valve and using a screw having a compression ratio of 2.75 and a length of diameter ratio of 18.5. The rear and front zones of the barrel of the Van Dorn machine were maintained at a temperature of 620° F. Nozzle temperature was 630° F. and a back pressure of 300 psi. was employed. An injection pressure of 19,000 psi. was applied to force the screw toward the nozzle at maximum speed thereby injecting the polymer through the nozzle into a mold which was heated to 425° F. The screw was forced toward the nozzle with the aid of a booster over a period of 3 seconds, after which the booster was discontinued and the screw was held in position for another 7 seconds after which it was retracted. The overall molding cycle was 20 seconds. After cooling of the mold, test bars were removed therefrom. The physical properties of the test bars as molded are reported in Table I.

EXAMPLE II

Test bars were molded from the polymer described in Example I except that 0.5 wt.% polytetrafluoroethylene was blended into the polymer together with 3 wt.% $TiO_2$. The flow properties of this composition were the same as those reported in Example I. Test bars were injection molded according to the procedure described in Example I. The physical properties of the test bars as molded are reported in Table I.

Test bars prepared according to Examples I and II were subjected to a post molding treatment which entailed heating the test bars at a temperature ranging from 240° F. to 500° F. over a period of two days. The properties of the heat-treated test bars are reported in Table I.

EXAMPLE III

The polymer prepared in Example I was injection molded by low compression ratio reciprocating screw injection molding for comparative purposes. The molding was performed using a purged 5 ounce Stokes machine equipped with a 1 to 1 compression ratio screw and without a non-return check valve. The length to diameter ratio of the screw was 20. The injection molding was carried out by a procedure similar to that employed in Example I under the following conditions:

| Barrel Temperatures | |
|---|---|
| Rear Zone | 600° F. |
| Central Zone | 610° F. |
| Front Zone | 610° F. |
| Nozzle Temperature | 610° F. |
| Mold Temperature | 450° F. |

The properties of the test bars, both as-molded and heat-treated as described above, are reported in Table I.

EXAMPLE IV

Test bars were prepared from the composition described in Example II according to the injection molding procedure of Example III. Test bar properties are reported in Table I.

EXAMPLE V

For comparative purposes, a sample of the flash and steam dried polymer prepared in Example I was further dried in two stages at a first stage temperature profile ranging from 350° F. to 450° F. and a second stage temperature profile ranging from 450°–460° F. As a result of this drying, a substantial proportion of the amic acid units contained in the polymer molecules were converted to amide-imide units. The resultant polymer was a predominantly amide-imide group containing polymer having a spiral flow of 3 inches at 600° F. and 20,950 psi. and an estimated melt flow rate of about 2 to 12 g/10 min. at 620° F. This polymer then was blended with 3 wt.% $TiO_2$ according to the procedure employed in Example I. The polymer was molded according to the procedure of Example III and test bar properties, both asmolded and heat-treated, are reported in Table I.

TABLE I

| EXAMPLE | | Tensile Strength (psi $\times 10^4$) | Tensile Elongation (%) | Tensile Modulus (psi $\times 10^5$) |
|---|---|---|---|---|
| I | As-Molded | 1.01 | 1.24 | 8.39 |
| | Heat-Treated | 2.58 | 11.86 | 8.52 |
| II | As-Molded | 1.01 | 1.51 | 7.02 |
| | Heat-Treated | 2.40 | 12.20 | 7.27 |
| III | As-Molded | 0.90 | 1.10 | 8.42 |
| | Heat-Treated | 2.57 | 11.12 | 7.39 |
| IV | As-Molded | 1.16 | 1.64 | 7.63 |
| | Heat-Treated | 2.54 | 15.30 | 7.30 |
| V | As-Molded | 1.35 | 3.74 | 8.51 |
| | Heat-Treated | 2.60 | 13.80 | 7.86 |

The foregoing Examples and Table I illustrate the improved processability of the polymers described herein and that molded articles prepared by injection molding such polymers at high compression ratios (Examples I and II) exhibit physical properties comparable or superior to those of molded articles prepared by conventional low compression ratio injection molding of such polymers (Examples II and IV). Additionally, it can be seen that test bars prepared according to this invention (Examples I and II) compare favorably with test bars prepared from conventional polyamide-imide molding compounds (Example V).

EXAMPLE VI

A fiber-filled molding composition was prepared from the vacuum dried polymer described in Example I and varying levels of 3/16" glass and graphite fibers. The polymer and fibers were first dryblended and then melt blended in a Colombo RC-9 twin screw extruder at a temperature of 600° F. The graphite fibers were obtained from Great Lakes Carbon Corp. and are identified as Fortafil-3. The molding compositions were injection molded to form test bars using a 1:1 compression ratio screw according to the procedure described in Example III. The molded test bars were then heat-treated in accordance with the procedure described following Example II. Physical properties of the test bars and spiral flow values of the molding compounds are reported in Table II.

This example and Table II illustrate that filled molding compositions containing the polymers described herein can be injection molded and that fibrous fillers can be employed to form articles of improved physical properties as compared with conventional unfilled polyamideimide molding compounds. It is to be understood that the high spiral flow polymers described herein are sufficiently fluid to permit uniform dispersion of fillers throughout the molded articles, and the improved physical properties of such molded articles are attributable, in large part, to such uniform dispersion.

TABLE II

| Sample | 1 | 2 | 3 | 4 | 5 | 6 | 7 | 8 | 9(A) |
|---|---|---|---|---|---|---|---|---|---|
| Fiber Content (wt. %) | 25% glass | 30% glass | 25% glass | 30% glass | 25% graphite | 30% graphite | 40% graphite | 50% graphite | 0 |
| Spiral Flow (inches at 600° F. and 20,950 psi) | 5.5 | 6.0 | 5.0 | 4.5 | 4.75 | 4.25 | — | — | 3 |

TABLE II-continued

| Sample | 1 | 2 | 3 | 4 | 5 | 6 | 7 | 8 | 9[A] |
|---|---|---|---|---|---|---|---|---|---|
| Tensile Strength (psi × $10^4$)[B] | 2.71 | 2.79 | 2.77 | 2.73 | 2.50 | 2.40 | 2.45 | 2.40 | 2.60 |
| Tensile Elongation (%)[B] | 5.2 | 4.8 | 5.9 | 4.1 | 2.9 | 3.3 | 3.7 | 3.0 | 13.80 |
| Tensile Modulus (psi × $10^5$)[B] | 15.3 | 17.9 | 14.0 | 17.7 | 27.9 | 28.7 | 42.5 | 44.3 | 7.86 |
| Notched Izod Impact Strength (ft.-lb/in)[C] | 1.51 | 1.55 | 1.53 | 1.63 | 1.31 | 1.41 | 0.93 | 0.77 | — |

[A]Sample 9 is the unfilled test bar prepared in Example V and is included in Table II for comparative purposes.
[B]Tensile properties were determined at room temperature according to ASTM D-638.
[C]Izod values were determined at room temperature according to ASTM D-256.

EXAMPLE VII

A polyamide-imide was prepared by polymerizing 16.5 parts by weight 4-trimellitoyl anhydride chloride (TMAC), 0.5 parts by weight trimellitic anhydride, 11.3 parts of weight oxybis(aniline), and 2.6 parts by weight meta-phenylenediamine in 69.0 parts by weight N-methylpyrrolidone in a glass-lined Pfaudler reactor equipped with mechanical stirrer and nitrogen purge. The TMAC was added over 5¾ hours, temperature increasing from 52° to 94° F. during addition. Polymerization continued for 3 hours after completion of the TMAC addition after which the polymer was precipitated, over a period of 2 hours, with deionized water. The precipitated polymer was centifuged and then steam dried and flash dried at a temperature of 300° F. The dried polymer was then cured over 45 minutes, using a Bartlett-Stow Rotary Calciner, at 350° F. in a first zone, 400° F. in a second zone, and 450° F. in a third zone.

A portion of the resulting polymer, having a melt flow rate of about 4 g/10 min. at 620° F. and a spiral flow of 7.5 inches at 600° F. and 20,950 psi., was filled with 30 wt.% kaolin and compounded according to the procedure of Example V. The kaolin-filled composition had a spiral flow of 5.5 inches at 600° F. and 20,950 psi. Test bars were molded according to the procedure of Example III. For comparative purposes, test bars were molded from a sample of polymer which had not been filled. Results are reported below:

| Sample | 1 | 2 |
|---|---|---|
| Kaolin Level (wt. %) | 30 | 0 |
| Tensile Strength (psi) | 21,100 | 25,000 |
| Tensile Elongation (%) | 5.06 | 14.8 |
| Tensile Modulus (psi) | 1,610,000 | — |

This example illustrates preparation of a particulate filled molding composition and the injection molding thereof. The use of such filled compositions can result in substantial cost savings and as can be observed from the physical properties of Samples 1 and 2, such cost savings can be achieved with only slight decreases in tensile strength and elongation. It also is to be noted that the polymer employed in this example had a relatively low melt flow rate even prior to incorporation of the filler, but the spiral flow of the polymer was high enough to permit incorporation of filler and injection molding of the resultant composition.

It will be apparent to persons of skill in the art that a variety of modifications of this invention can be made without departing from the scope of the invention as described herein and in the appended claims.

I claim:

1. A process for injection molding a polymer prepared by polymerizing components consisting essentially of at least one aromatic tricarboxylic acid derivative, said acid having two carboxyl groups ortho to one another, and at least one aromatic diprimary diamine having 6 to 10 carbon atoms or composed of two aromatic moieties of 6 to 10 carbon atoms each, each of said moieties containing one primary amino group and being linked to the other moiety directly or through —O—, —S—, —$SO_2$—, —CO—, or —$CH_2$—, the molecular weight of said polymer being controlled such that the spiral flow rate thereof is at least about 4 inches at 600° F. and 20,950 psi., said injection molding comprising plasticating and compacting said polymer between the flights of a high-compression ratio screw under reciprocating screw injection molding conditions.

2. The process according to claim 1 wherein the compression ratio ranges from about 1.8 to 3.5 and the aromatic tricarboxylic acid derivative is a derivative of trimellitic acid.

3. The process according to claim 2 wherein the polymer is a predominantly amic acid group containing polymer prepared by polymerizing the 4-acyl chloride derivative of trimellitic acid anhydride and a mixture of oxybis(aniline) and meta-phenylenediamine, and drying the resultant polymer at below 300° F. whereby substantial imidization of amic acid units and increases in molecular weight are avoided.

4. The process according to claim 3 wherein the polymer has a spiral flow ranging from about 5 to 10 inches at 600° F. and 20,950 psi.

5. The process according to claim 2 wherein the polymer is prepared by polymerizing a mixture of the 4-acyl chloride derivative of trimellitic acid anhydride and trimellitic acid anhydride and a mixture of oxybis-(aniline) and meta-phenylenediamine, said trimellitic acid anhydride being present in an amount which is effective to control the molecular weight of said polymer.

6. The process according to claim 5 wherein the polymer has a spiral flow ranging from about 5 to 10 inches at 600° F. and 20,950 psi.

7. The process according to claim 1 further comprising heat treating the molded article.

8. A process for preparing a molded article which comprises plasticating and compacting between the flights of a reciprocating screw having a compression ratio ranging from about 1 to about 2.5 under reciprocating screw injection molding conditions a composition comprising (1) from about 40 to 95 wt.% of a polymer prepared by polymerizing components consisting essentially of at least one aromatic tricarboxylic acid derivative, said acid having two carboxyl groups ortho to one another, and at least one aromatic diprimary diamine having 6 to 10 carbon atoms or composed of two aromatic moieties of 6 to 10 carbon atoms each, each of said moieties containing one primary amino group and being linked to the other moiety directly or through —O—, —S—, —$SO_2$—, —CO—, or —$CH_2$—, the molecular weight of said polymer being controlled such that the spiral flow rate thereof is at least about 4 inches at 600° F. and 20,950 psi; and (2) from about 5 to about 60 wt.% filler.

9. The process according to claim 8 wherein the aromatic tricarboxylic acid derivative is a derivative of trimellitic acid.

10. The process according to claim 9 wherein the polymer is a predominantly amic acid group containing polymer prepared by polymerizing the 4-acyl chloride derivative of trimellitic acid anhydride and a mixture of oxybis(aniline) and meta-phenylenediamine, and drying the resultant polymer at below 300° F. whereby substantial imidization of amic acid units and increases in molecular weight are avoided.

11. The process according to claim 10 wherein the composition contains from about 20 to about 40 wt.% filler.

12. The process according to claim 9 wherein the polymer is prepared by polymerizing a mixture of the 4-acyl chloride derivative of trimellitic acid anhydride and trimellitic acid anhydride and a mixture of oxybis-(aniline) and meta-phenylenediamine, said trimellitic acid anhydride being present in an amount which is effective to control the molecular weight of said polymer.

13. The process according to claim 12 wherein the composition contains from about 20 to 40 wt.% filler.

14. The process according to claim 13 wherein the filler is a fibrous filler.

15. The process according to claim 13 wherein the filler is a particulate filler.

16. The process according to claim 13 wherein the filler is a compatible polymeric filler.

17. The process according to claim 8 further comprising heat treating the molded article.

* * * * *

UNITED STATES PATENT OFFICE
CERTIFICATE OF CORRECTION

Patent No. 4,224,214   Dated September 23, 1980

Inventor(s) Yu-Tsai Chen

It is certified that error appears in the above-identified patent and that said Letters Patent are hereby corrected as shown below:

| Patent Column | Line | |
|---|---|---|
| 4 | 39 | "(1" x 3/4") should be --(1" x 1 3/4") |
| 4 | 42 | "ran" should be --ram-- |
| 6 | 58 | "0,08" should be --0.08-- |
| 9 | 27 | "∓ injection for--" should be --"injection for-- -- |
| 10 | 60 | "of" second occurrence should be --to-- |
| 11 | 42 | The table should include the following: |

--Mold Cycle

|  |  |
|---|---|
| Injection Forward | 3 seconds |
| Injection Hold | 6 seconds |
| Overall Cycle | 20 seconds |
| Injection Speed | Maximum |
| Injection Pressure | 19,000 psi. |
| Back Pressure | 250 psi.-- |

UNITED STATES PATENT OFFICE
CERTIFICATE OF CORRECTION

Patent No. 4,224,214  Dated September 23, 1980

Inventor(s) Yu-Tsai Chen

It is certified that error appears in the above-identified patent and that said Letters Patent are hereby corrected as shown below:

| Patent Column | Line | |
|---|---|---|
| 12 | 6 | "asmolded" should be --as-molded-- |
| 12 | 39 | "dryblended" should be --dry-blended-- |
| 13 | 15 | "parts of weight" should be --parts by weight-- |

Signed and Sealed this

Twenty-fifth Day of August 1981

[SEAL]

Attest:

GERALD J. MOSSINGHOFF

Attesting Officer

Commissioner of Patents and Trademarks